(12) United States Patent
Zieff et al.

(10) Patent No.: US 7,347,162 B2
(45) Date of Patent: Mar. 25, 2008

(54) SQUIRREL PROOF BIRD FEEDER

(75) Inventors: Mark Zieff, Sudbury, MA (US); John Stone, Southboro, MA (US); Douglas F. Melville, Jr., Simsbury, CT (US)

(73) Assignee: Woodstream Corporation, Lititz, PA (US)

(*) Notice: Subject to any disclaimer, the term of this patent is extended or adjusted under 35 U.S.C. 154(b) by 0 days.

(21) Appl. No.: 11/137,633

(22) Filed: May 25, 2005

(65) Prior Publication Data

US 2005/0268858 A1    Dec. 8, 2005

Related U.S. Application Data

(60) Provisional application No. 60/574,140, filed on May 25, 2004.

(51) Int. Cl.
*A01K 61/02* (2006.01)
(52) U.S. Cl. .................. 119/52.3; 119/57.9; 119/52.2; 119/57.8; 119/63
(58) Field of Classification Search ....... D30/124–128; 119/52.3, 57.9, 52.4, 52.2, 55, 57.8, 52.1, 119/63
See application file for complete search history.

(56) References Cited

U.S. PATENT DOCUMENTS

| | | | | |
|---|---|---|---|---|
| 1,530,101 A * | 3/1925 | Ashing | ................. | 119/55 |
| 2,230,058 A * | 1/1941 | Hornung | ................. | 119/52.3 |
| 3,124,103 A | 3/1964 | Stainbrook | ................. | 119/51 |
| 3,145,690 A * | 8/1964 | Bachman | ................. | 119/52.3 |
| 3,164,130 A | 1/1965 | Curtis et al. | ................. | 119/51 |
| 3,241,525 A | 3/1966 | Meier | ................. | 119/55 |
| 4,541,362 A * | 9/1985 | Dehls | ................. | 119/57.9 |
| 4,649,865 A | 3/1987 | Riggi | ................. | 119/51 |
| 5,048,461 A | 9/1991 | Wessner | ................. | 119/52.3 |
| 5,375,558 A | 12/1994 | Drakos | ................. | 119/57.9 |
| 5,676,089 A | 10/1997 | Morganson | ................. | 119/52.3 |
| 5,720,238 A * | 2/1998 | Drakos | ................. | 119/57.9 |
| 5,964,183 A * | 10/1999 | Czipri | ................. | 119/52.3 |
| 6,050,221 A | 4/2000 | Eaton et al. | ................. | 119/57.9 |
| 6,253,707 B1 * | 7/2001 | Cote | ................. | 119/57.9 |
| 6,543,384 B2 * | 4/2003 | Cote | ................. | 119/57.9 |
| 6,584,932 B2 * | 7/2003 | Rogers et al. | ................. | 119/57.9 |
| 2003/0033985 A1 * | 2/2003 | Hardison | ................. | 119/57.9 |
| 2003/0136347 A1 * | 7/2003 | Fasino | ................. | 119/57.9 |
| 2005/0263083 A1 * | 12/2005 | Coroneos | ................. | 119/57.1 |

FOREIGN PATENT DOCUMENTS

CA      2330868      *  1/2001

* cited by examiner

*Primary Examiner*—Andrea M. Valenti
(74) *Attorney, Agent, or Firm*—Jacobson Holman PLLC

(57) ABSTRACT

A bird feeder provides a feed container extending downwardly, a limited support surface positioned around the feed container at a lower end thereof and having one or more feeding ports, the limited support surface being adapted for supporting a feeding animal in proximity to the one or more feeding ports, a biasing mechanism adapted for supporting the limited support surface at a lower end of the feed container and for allowing a limited amount of vertical movement of the limited support surface, and one or more portal shields affixed to the biasing mechanism and adapted to open and close the feeding ports, wherein the biasing mechanism is further adapted to open and close the feeding ports with the portal shields in response to the limited amount of vertical movement upwardly and downwardly, respectively, of the limited support surface.

19 Claims, 4 Drawing Sheets

SQUIRREL PROOF BIRD FEEDER

CROSS-REFERENCE TO RELATED APPLICATIONS

This application claims priority to and the benefit of U.S. Provisional 60/574,140, entitled SQUIRREL PROOF BIRD FEEDER, filed May 25, 2004, which is hereby incorporated by reference herein.

BACKGROUND OF THE INVENTION

1. Field of the Invention

This invention generally relates to bird feeders which resist squirrel access to feed intended for birds, and in particular to bird feeders which prevent such access by the closure of feeding ports.

2. Description of the Prior Art

Various different types of bird feeders are known in the art. They usually comprise a container that has portals for birds to access food. Some designs have these portals ostensibly small enough only to allow access to the food by birds. Other designs attempt to preclude the possibility of squirrel invasion.

There have been numerous attempts over the years to design a bird feeder, which is truly squirrel proof. Certain of the feeders available may be designed for a specific purpose and may be relatively squirrel proof.

Squirrels are notorious for helping themselves to the food. The immense ingenuity of squirrels to gain access to bird food held in feeders is well known. This is so even when the feeder is hung in seemingly inaccessible places. Moreover, squirrels tend to attack the feeders and break into them causing not only loss of the food but loss of the feeder as well.

Numerous attempts have been made in the past to make a feeder which is strong enough to stand up to the squirrels and which is configured such that the squirrels cannot gain access to the food. Hitherto, no satisfactory feeder has been designed. Currently, a need still exists for a squirrel proof feeder that will not only thwart off the advances of squirrels but can withstand their assault in the desire to obtain food.

SUMMARY OF THE INVENTION

In one embodiment, a bird feeder, comprises a feed container extending downwardly, a limited support surface positioned around the feed container at a lower end thereof and having one or more feeding ports, the limited support surface being adapted for supporting a feeding animal in proximity to the one or more feeding ports, a biasing mechanism adapted for supporting the limited support surface at a lower end of the feed container and for allowing a limited amount of vertical movement of the limited support surface, and one or more portal shields affixed to the biasing mechanism and adapted to open and close the feeding ports, wherein the biasing mechanism is further adapted to open and close the feeding ports with the portal shields in response to the limited amount of vertical movement upwardly and downwardly, respectively, of the limited support surface.

The biasing mechanism may be adapted to support the limited support surface in an upward direction to maintain the portal shields in an open position for the feeding ports, and may be further adapted to allow closure of the feeding ports in response to a predetermined amount of weight being applied to the limited support surface. The biasing mechanism may be adapted for adjustment of an amount of bias applied to the limited support surface. The biasing mechanism may be adapted to further support the weight of a plurality of birds perched on the housing cover, while maintaining the portal shields in an open position.

The bird feeder may further comprise an open framework surrounding at least a portion of the feed container and resting on the limited support surface, wherein the framework is adapted to allow non-bird animals, which try to access the feeding ports, to hang from the framework and thereby transfer their weight to the limited support surface. The biasing mechanism may be adapted to support the open framework as well as the limited support surface in an upward direction while maintaining the portal shields in an open position for the feeding ports.

The biasing mechanism may be adapted to allow closure of the feeding ports by the portal shields under the weight of a squirrel located on the limited support surface. The feed container may include a hopper and a distribution tray adapted to distribute feed from a bottom of the hopper, and the limited support surface may be a housing cover located over the distribution tray and around the hopper and adapted for a limited amount of vertical movement with respect to the distribution tray and the hopper. The biasing mechanism may include one or more spring loaded levers rotationally mounted to the housing cover and adapted to support the housing cover by resting on the distribution tray. Each of the portal shields may be affixed to a pair of spring loaded levers to close the feeding ports with movement of the spring loaded levers. The feeding ports may include a first plurality of feeding ports, and the portal shields may include a first shield adapted for opening and closing the first plurality of feeding ports. The first plurality of feeding ports may be arranged linearly, and the first portal shield may be affixed to an elongated bracket having a pair of spring biased levers located at opposite ends thereof. The bird feeder may further comprise a second plurality of feeding ports, wherein the portal shields includes a second portal shield adapted for closing the second plurality of feeding ports. The distribution tray may extend outwardly from the bottom of the hopper on opposing sides of the hopper, and the first and second plurality of feeding ports may be located on the opposing sides of the hopper. The spring loaded levers may be rotated inwardly by biasing springs, and the spring loaded levers are adapted to rotate outwardly to close the feeding ports under a predetermined amount of weight on the housing cover.

The feed hopper may include one or more sides tapered inwardly in a downward direction towards the feeding ports. The feed hopper may extend a sufficient distance downwardly to prevent a squirrel sized animal from reaching the one or more feeding ports while hanging from a top portion of the feed hopper. The food container may be adapted to be hung from an upper portion thereof to support the bird feeder.

BRIEF DESCRIPTION OF THE DRAWINGS

The present invention is illustratively shown and described in reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
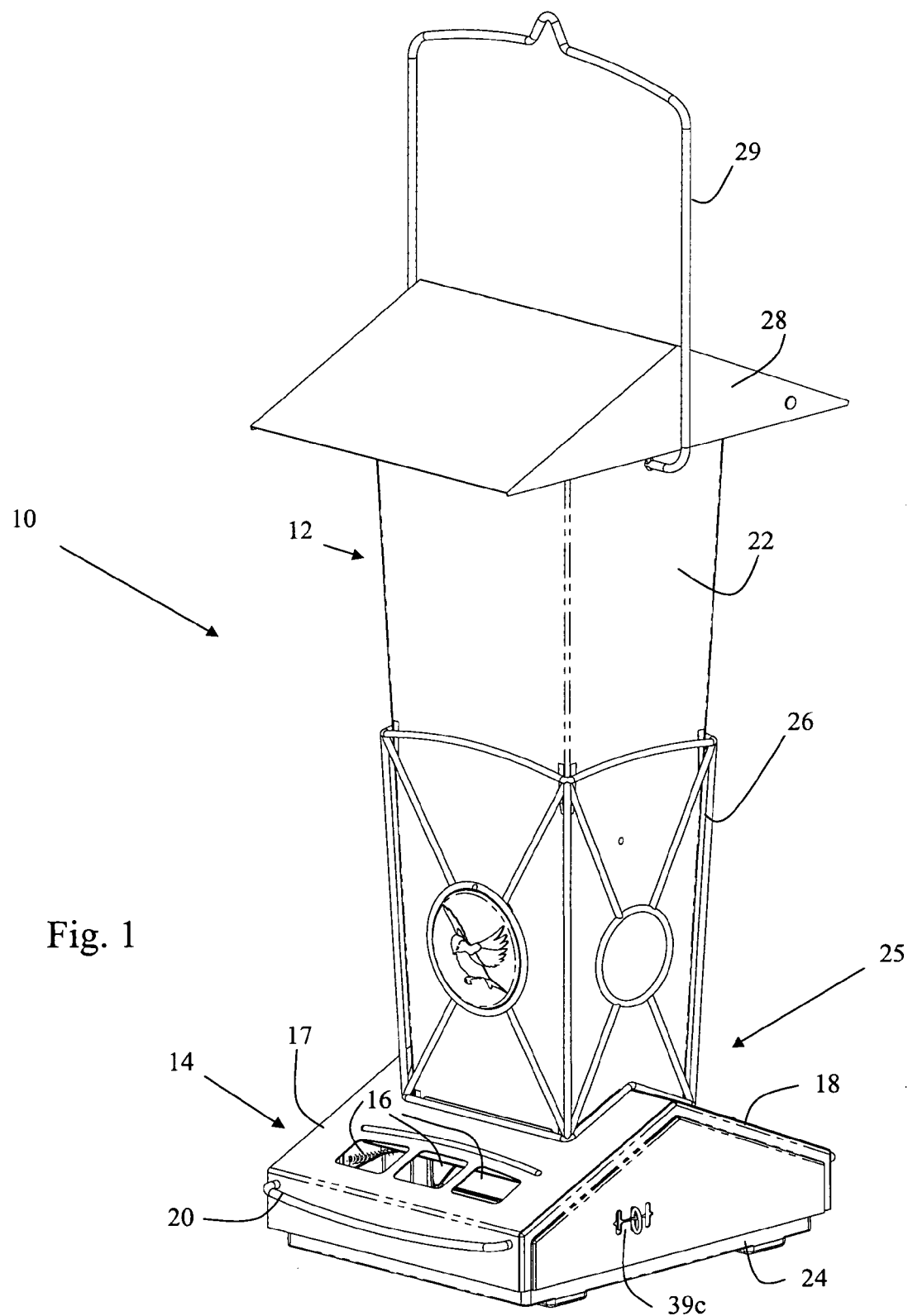
FIG. 1 shows a perspective view the of a bird feeder constructed in accordance with one embodiment of the present invention.

FIG. 1 shows a bird feeder 10, which generally includes a feed container 12, a feeding area 14, and a multiplicity of feeding ports 16. Feeding area 14 includes a limited support surface 17, formed by a housing cover 18 and a perch 20 for one or more birds. Feed container 12 generally includes a feed hopper 22 and a feed distribution tray 24 affixed to the lower end of hopper 22. An open framework 26 is shown attached to the top of housing cover 18 and extends upwardly around feed hopper 22. Housing cover 18 likewise extends around hopper 22. Feed container 12 further includes a hinged top cover 28 and a wire handle 29 adapted for hanging feed container 10. Feeder 10 has a sufficiently extended height to prevent animals, such as squirrels from hanging from top cover 28 or handle 29 and reaching feeding ports 16. For the same reason, the sides of feed hopper 22 are tapered inwardly in the downward direction towards feeding ports 16 to generally deny an animal purchase or foot hold thereon.

Figure 2:
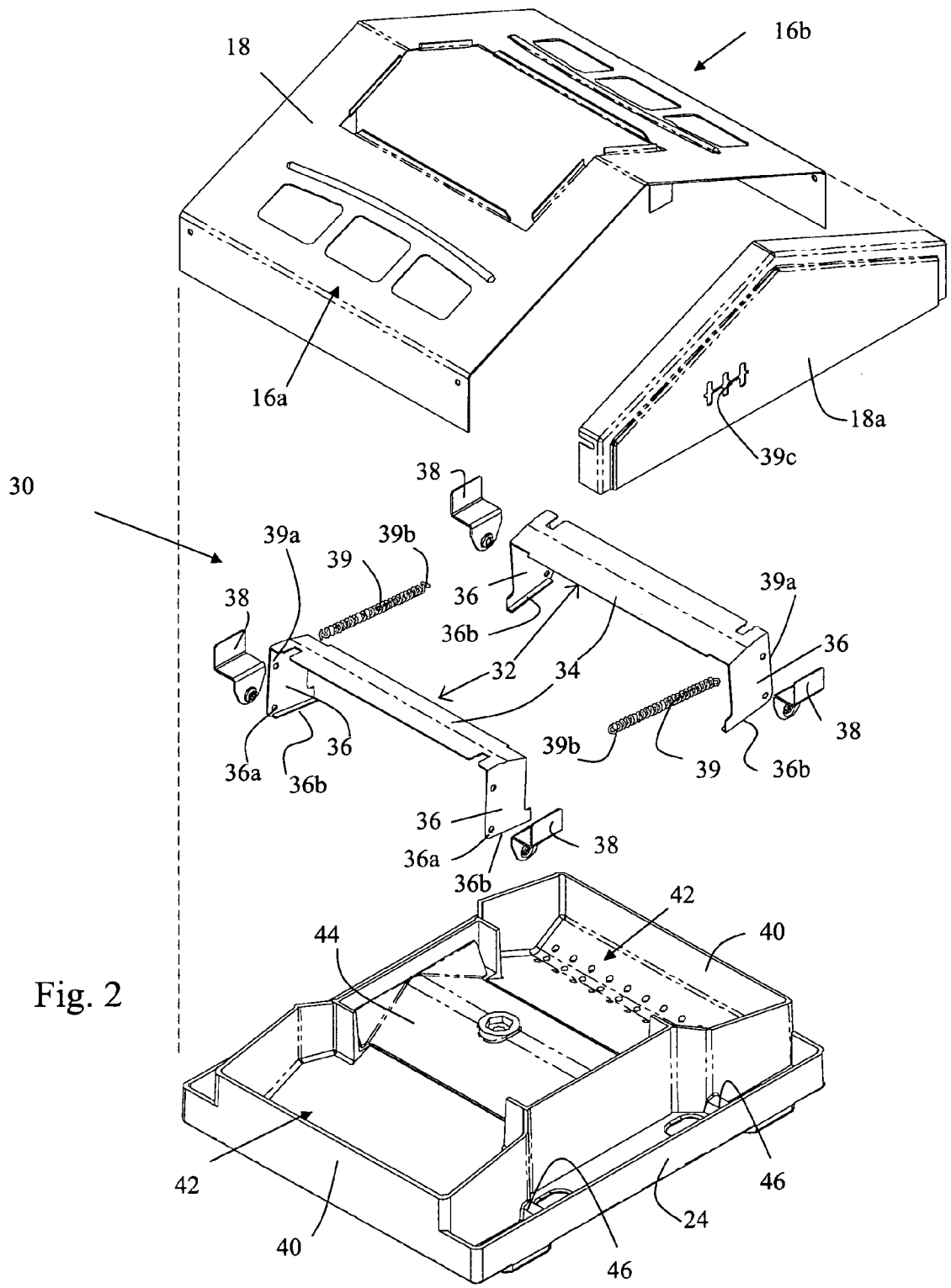
FIG. 2 shows an exploded view of a lower portion of the bird feeder of FIG. 1.

FIG. 2 is an exploded view of the lower portion of feeder 10 including housing cover 18, a biasing mechanism 30 and distribution tray 24. Housing cover 18 is shown with one of two side panels 18a. Biasing mechanism 30 includes a pair of elongated brackets 32 constructed integrally with separate elongated portal shield portions 34. Portal shield portions 34 are adapted for opening and closing two pluralities of feeding ports 16a, 16b, which are disposed on opposing sides of housing cover 18. Each plurality of feeding ports 16a, 16b is linearly arranged.

Brackets 32 each include a pair of end members 36 affixed at each end of central portal shield portion 34. In this manner, a single portal shield portion 34 can be used to close a plurality of feeding ports 16a, 16b. Although portal shield portions 34 are shown to be integrally constructed with brackets 32, any suitable arrangement may be used, such as separate portal shields, which may be attached to mechanism 30 at brackets 32.

Also shown are separate axle mounts 38 located for use with each end member 36 of brackets 32. Brackets 32 are designed to be biased by separate springs 39, which are adapted at one end to engage brackets 32 at holes 39a in end members 36. The other end 39b of spring 39 is intended for adjustable attachment, by any suitable means, to a series of slots, or openings 39c (FIGS. 1, 2), whereby the tension on spring 39 may be easily adjusted for optimum results.

Further shown in FIG. 2 are details of distribution tray 24, which generally includes a peripheral wall 40 adapted to contain feed in a pair of opposing bins 42. Also included is a divider 44, which directs feed from hopper 22 (FIG. 1) into the opposing bins 42 under the force of gravity. Distribution tray 24 further includes a separate abutment or ridge 46 located to interfere with and to act as a fulcrum for end members 36 as a result of the vertical movement of housing cover 18.

Figure 3:
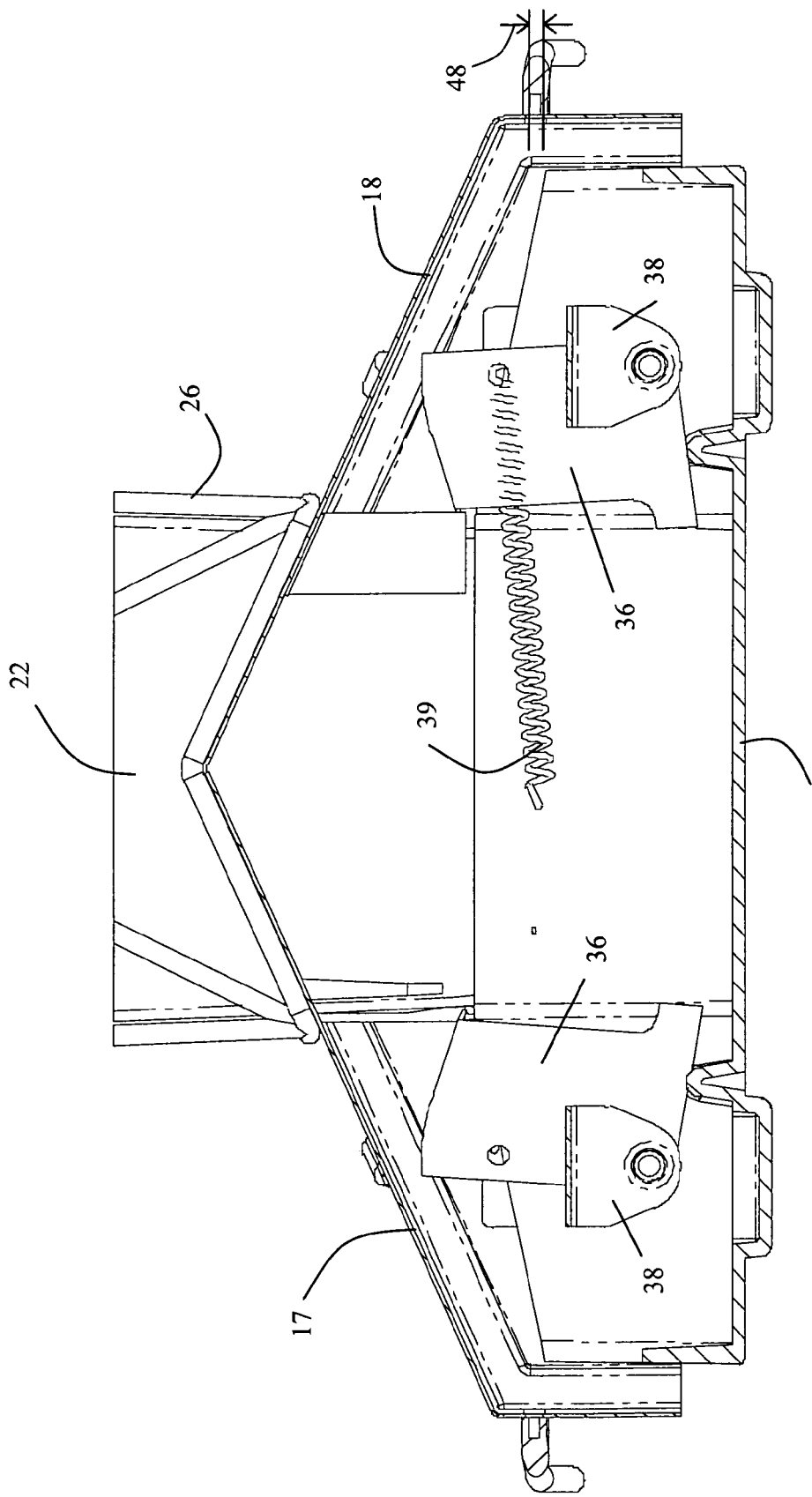
FIG. 3 shows a partial cross sectional side view of the lower portion of the bird feeder of FIG. 1 illustrating the feeding ports in the open position.

In construction, axle mounts 38 are affixed to side panels 18a of housing cover 18 and end members 36 of brackets 32 are rotationally mounted through holes 36a to axle mounts 38. Brackets 32 are placed under a biasing force by springs 39 to rotate both brackets 32 inwardly towards each other (FIG. 3). When housing cover 18 is placed on distribution tray 24, edges 36b of end members 36 make contact with ridges 46 and thereby support housing cover 18 in a slightly elevated position over distribution tray 24. When a sufficient weight, determined by the tension of springs 39, is placed upon housing cover 18, end members 36 are forced to rotate outwardly by the downward force from axle mounts 38 and the interference from ridges 46, and thereby push portal shield portions 34 outwardly, blocking feeding ports 16, 16a, 16b (FIG. 4).

FIG. 3 shows a partially sectional side view of the lower portion of feeder 10 (FIG. 1) including distribution tray 24, hopper 22, framework structure 26 and housing cover 18. Also shown are end members 36, a spring 39 and axle mounts 38. FIG. 3 represents the normal operational bird feeding arrangement between housing cover 18 and distribution tray 24, wherein spring 39 tension causes end members 36 to rotate inwardly and maintain the height 48 of housing cover 18 above distribution tray 24. The tension of spring 39 is such that a multiplicity of birds may be perched on limited support surface 17 without causing downward movement of housing cover 18 and closure of feeding ports 16, 16a, 16b (FIGS. 1, 2)

Figure 4:
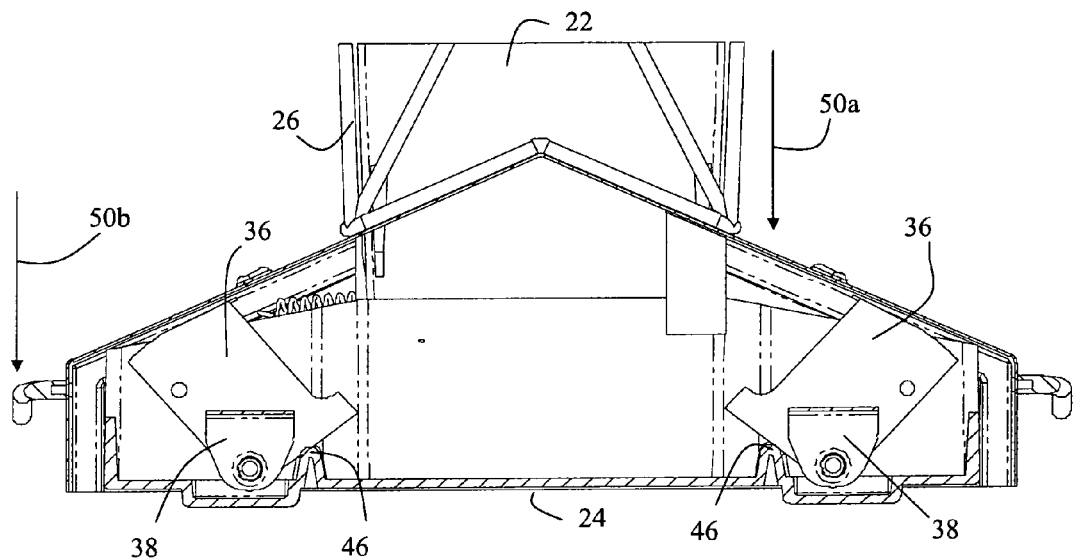
FIG. 4 shows a partially sectional side view of the lower portion of the bird feeder of FIG. 1 illustrating the feeding ports in the closed position.

FIG. 4 is a similar cross sectional side view to FIG. 3, wherein end members 36 are shown to be rotated outwardly because of downward force created by an undesirable animal, such as a squirrel represented by arrow 50a, or an undesirable bird, such as a crow or raven represented at arrow 50b. This downward force is translated through axle mounts 38, and the interference with ridges 46, thus pushing portal shield portions 34 (FIG. 2) into a closed and blocking position for feeding ports 16a, 16b (FIG. 2).

The purpose of open framework 26 is more apparent in FIG. 4 as the downward force 50a of a squirrel may be applied to framework structure 26 instead of top cover 18 and still result in the same downward movement of top cover 18 and closure of feeding ports 16. While the sides of feed hopper 22 are tapered inwardly to deny an animal purchase, open framework 26 is a much more animal friendly device and thus helps to guarantee the desirable closure of feeding ports 16

Figure 5:
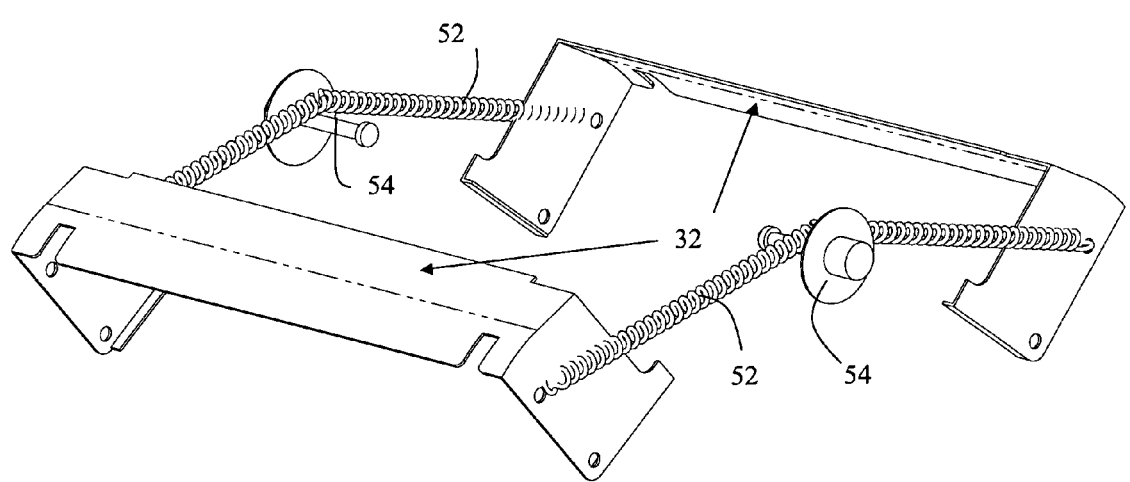
FIG. 5 shows a perspective view of alternate embodiment of the biasing mechanism for use in the bird feeder of FIG. 1 illustrating the assembled biasing mechanism removed from the bird feeder.

FIG. 5 shows an alternate biasing arrangement for brackets 32, wherein springs 52 extend between opposing brackets 32 on each end thereof, and spring tension is adjusted by raising the height of spring anchors 54. It can be appreciated that each of the end members 36 works like a spring loaded lever rotationally mounted to housing cover 18 and supporting housing cover 18 in an elevated position by resting on ridges of distribution tray 24

The bird feeder thus constructed functions very efficiently to prevent undesired access to the bird feeder of the present invention. When feeder 10 is hung by handle 29 with sufficient ground clearance, animals must support themselves on limited support surface 17 in order to access feeding ports 16. Their weight thereby closes feeding ports 16 and denies access.

The present invention is illustratively described above in reference to the disclosed embodiments. Various modifications and changes may be made to the disclosed embodi-

What is claimed is:

1. A bird feeder comprising:
   a feed container extending downwardly from an upper end thereof;
   a limited support surface positioned at a lower end of said feed container and said limited support surface having one or more feeding ports therein, said limited support surface supporting a feeding bird in proximity to said one or more feeding ports;
   a biasing mechanism supporting said limited support surface at the lower end of said feed container and allowing a limited amount of vertical movement of said limited support surface;
   one or more portal shields operatively connected to said biasing mechanism to open and close said one or more feeding ports in response to the limited amount of vertical movement upwardly and downwardly, respectively, of said limited support surface; and
   an open framework surrounding at least a portion of said feed container and affixed directly to said limited support surface to transfer to said limited support surface an applied weight of a non-bird animal to close said one or more feeding ports.

2. The bird feeder of claim 1, wherein said biasing mechanism supports said limited support surface in an upward direction to maintain said one or more portal shields in an open position for said one or more feeding ports and allows closure of said one or more feeding ports in response to a predetermined amount of weight being applied to said limited support surface.

3. The bird feeder of claim 2, wherein said biasing mechanism provides an adjustable amount of bias applied to said limited support surface.

4. The bird feeder of claim 2, wherein said biasing mechanism supports a weight of a plurality of birds perched on said limited support surface while maintaining said one or more portal shields in an open position.

5. The bird feeder of claim 1, wherein said framework allows non-bird animals trying to access said one or more feeding ports to hang from said open framework and thereby transfer their weight to said limited support surface.

6. The bird feeder of claim 5, wherein said biasing mechanism supports said open framework and said limited support surface in an upward direction while maintaining said one or more portal shields in an open position for said one or more feeding ports.

7. The bird feeder of claim 1, wherein said biasing mechanism allows closure of said one or more feeding ports by said one or more portal shields under a weight of a squirrel located on said limited support surface.

8. The bird feeder of claim 1, wherein said feed container includes a hopper and a distribution tray to distribute feed from a bottom of said hopper, and said limited support surface is a housing cover located over said distribution tray and around said hopper such that the limited amount of vertical movement is with respect to said distribution tray and said hopper.

9. The bird feeder of claim 8, wherein said biasing mechanism includes one or more spring biased levers rotationally mounted to said housing cover to support said housing cover by resting on said distribution tray.

10. The bird feeder of claim 9, wherein each of said one or more portal shields is affixed to a pair of said spring biased levers so as to close said feeding ports with movement of said pair of spring biased levers.

11. The bird feeder of claim 10, wherein said one or more feeding ports includes a first plurality of feeding ports, and said one or more portal shields includes a first shield to open and close said first plurality of feeding ports.

12. The bird feeder of claim 11, wherein said first plurality of feeding ports is arranged linearly, and said first portal shield is affixed to an elongated bracket having said pair of spring biased levers located at opposite ends thereof.

13. The bird feeder of claim 11, further comprising a second plurality of feeding ports wherein said one or more portal shields includes a second portal shield to open and close said second plurality of feeding ports.

14. The bird feeder of claim 13, wherein said distribution tray extends outwardly from the bottom of said hopper on opposing sides thereof, and said first and second plurality of feeding ports and said first and second portal shields are located on said opposing sides of said hopper.

15. The bird feeder of claim 14, wherein said spring biased levers are rotated inwardly by biasing springs and are rotated outwardly to close said feeding ports under a predetermined amount of weight on said housing cover.

16. The bird feeder of claim 1, wherein said feed container includes one or more sides tapered inwardly in a downward direction towards said one or more feeding ports.

17. The bird feeder of claim 8, wherein said feed container extends a distance sufficient to prevent a squirrel-sized animal from reaching said one or more feeding ports while hanging from a top portion of said hopper.

18. The bird feeder of claim 17, wherein said feed container is configured to hang from an upper portion thereof to support said bird feeder.

19. A bird feeder comprising:
   a feed container extending downwardly from an upper end thereof and including a hopper and a distribution tray to distribute feed from a bottom of said hopper, said distribution tray extending outwardly from the bottom of said hopper on opposing sides thereof;
   a limited support surface positioned around said feed container at a lower end thereof and said limited support surface having a first and a second plurality of feeding ports therein, each located on said opposing sides of said hopper, said limited support surface being a housing cover located over said distribution tray and around said hopper to support a bird in proximity to said first and second pluralities of feeding ports;
   a biasing mechanism supporting said limited support surface at the lower end of said feed container and controlling access to said first and second pluralities of feeding ports in response to a limited amount of vertical movement upwardly and downwardly, respectively, of said limited support surface with respect to said distribution tray and said hopper, said biasing mechanism including a pair of spring biased levers rotationally mounted to said housing cover to support said housing cover by resting on said distribution tray, said spring biased levers being rotated inwardly by biasing springs and rotated outwardly to close said feeding ports under a predetermined amount of weight on said housing cover; and
   a first and a second portal shield each located on said opposing sides of said hopper to open and close a corresponding one of said first and second pluralities of feeding ports, each of said portal shields being operatively connected to said pair of spring biased levers so as to open and close said feeding ports with movement of said pair of spring biased levers.

* * * * *